(12) United States Patent
Kraml et al.

(10) Patent No.: US 6,490,297 B1
(45) Date of Patent: Dec. 3, 2002

(54) SYSTEM AND METHOD FOR AUTOMATIC SIGNALING CHANNEL IDENTIFICATION

(75) Inventors: Mark H. Kraml, Morris, NJ (US); Jane Mary Leonard, Dupage, IL (US); Harvey Rubin, Morris, NJ (US); Carl Joseph Spies, Kane, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/325,968

(22) Filed: Jun. 4, 1999

(51) Int. Cl.[7] ................................................. H04J 3/12
(52) U.S. Cl. ..................... 370/522; 370/236; 370/346; 370/449; 370/458; 455/434; 455/515
(58) Field of Search ............................. 370/235, 236.1, 370/236.2, 229, 336, 337, 345–347, 437–439, 442, 443, 449, 458, 462, 498, 522, 524, 422; 455/434, 450, 455, 88, 515

(56) References Cited

U.S. PATENT DOCUMENTS

| | | | | |
|---|---|---|---|---|
| 4,002,849 A | * | 1/1977 | Kotler et al. | 379/286 |
| 5,199,031 A | * | 3/1993 | Dahlin | 370/329 |
| 5,546,380 A | * | 8/1996 | Tomasi et al. | 370/252 |
| 5,570,467 A | * | 10/1996 | Sawyer | 455/515 |
| 5,790,551 A | * | 8/1998 | Chan | 370/348 |
| 5,794,147 A | * | 8/1998 | Huang | 455/434 |
| 5,809,421 A | * | 9/1998 | Manssen et al. | 455/434 |
| 5,946,306 A | * | 8/1999 | Talarmo | 370/337 |

* cited by examiner

Primary Examiner—Hassan Kizou
Assistant Examiner—David Odland
(74) Attorney, Agent, or Firm—Cohen, Pontani, Lieberman & Pavane

(57) ABSTRACT

The system and method of the invention enable any channel of a multi-channel communication link to be used for transmission of a control signal to a system component by a system controller. The system component, connected to the system controller by the multi-channel communication link, automatically locates the one or more signaling channels carrying the control signal(s) and then establishes communication with the system controller in accordance with the control signal(s). If no signaling channels are located after a predetermined number of attempts or after a predetermined period of time, the system component may, if particular conditions are met, reset itself before continuing to search for the signaling channel(s).

19 Claims, 2 Drawing Sheets

SYSTEM AND METHOD FOR AUTOMATIC SIGNALING CHANNEL IDENTIFICATION

BACKGROUND OF THE INVENTION

1. Field of the Invention

The present invention relates to a communication systems, and more particularly to a system and method for identifying one or more signaling channels during communication between a controller and a remote system component.

2. Description of the Related Art

High speed communication lines form the backbone of any telecommunication system. Typically, these lines connect various components of the telecommunication system and end users, thereby forming a system network and enabling high speed voice and data transfers between system components and end users. Additionally, high speed wireless communication links perform similar functions and are utilized in a similar manner.

The operation of the telecommunication system is commonly controlled from one or more controllers distributed throughout the system network. Control signals from the controllers are transmitted to various system components via the high speed communication lines or links along with signals carrying voice and data. These signals commonly contain control and maintenance information. Control information is used to establish and maintain communication connections between system components and the controller and also between system components and end users who receive and transmit video, voice and/or data through the connections. Maintenance information is used to initialize system components, to recover system components from errors and to monitor and manage their performance. The transmission of control and maintenance information between the controller and system components is commonly referred to as intra-system "signaling", or simply signaling.

Many high speed communication lines use a channelized format where the total bandwidth of a line is split into a predefined number of separate transmission channels or "slots". For example, a T1 line has 24 separate 64 Kilobits per second (Kbps) channels (hereinafter referred to as "DS0 time slots"), while an E1 line has 32 such slots. Most of the slots are used to carry end-user information such as data and voice transmissions that are carried by the telecommunications system as part of the primary communications service offered by the system. In each communication line, one or more of the DS0 time slots are used to carry the control signals. Similarly, wireless communication links also utilize channelized transmission formats.

In many previously known systems, the particular channels used for signaling are rigidly defined, i.e. "hard-coded," in the system hardware or firmware, or predefined in the system software, or configured by manual intervention during the setup of the equipment. Thus, in such arrangements system components always receive control signals via particular predefined channels. This arrangement is problematic, because in many instances service providers, who use system components to provide communication services to end users, each lease only a fraction of a communication line. Thus, service providers may not have access to the particular signaling channel that is not in their leased fraction of the line and, as a result, their system component has no access to remote signaling from the system controller. The problem is further exacerbated by the fact that the service provider must configure each component to the specific configuration suitable to the particular facilities provided on the available link.

SUMMARY OF THE INVENTION

It would thus be desirable to enable any channel of a multi-channel communication line or a wireless link to be used for transmission of control signals. It would further be desirable to enable a system component to automatically locate one or more signaling channels carrying control signals from a remote system controller to permit reception of control signals and to initiate communication therebetween.

The system and method of the invention enable any channel of a multi-channel communication link to be used for transmission of a control signal (hereinafter "signaling") by a system controller. A system component automatically locates one or more signaling channels and then establishes communication with the controller when the one or more of the channels have been located. If no signaling channels are located after a predetermined number of attempts or after a predetermined period of time, the system component may attempt to reinitialize the interface or diagnose the problem within it; these procedures are escalated and culminate in a full reset of the component, if required, before continuing to search for the signaling channels.

In accordance with the invention, a communications system is provided with a system controller for controlling the system's operation and for transmitting a control signal to a system component, a system component for providing communication services to end users, and a communication link capable of sending and receiving information units on multiple distinct physical or logical channels connecting the system controllers and the system component and having one or more channels available for carrying one or more control signals transmitted by the system controller to the system component. The system component includes a component controller for controlling the operation of the system component, for identifying and receiving the control signal from the system controller and for initiating communication with the system controller when the control signal is received. The system component may also include a component memory for a stored control program used to implement the procedures and protocols executed by the component controller when communication between the system component and the system controller is established; the system may elect to implement the procedures and protocols in hardware using a dedicated Application Specific Integrated Circuit (ASIC).

The control signal includes initialization information for the system component as well as instructions for establishing a communication connection between the system component and the system controller using an appropriate predetermined communication protocol. The control signal also includes a unique identifier for identifying, to the system component, the channel that is carrying the control signal as a signaling channel. The control signal is intermittently transmitted by the system controller to the system component on one or more of the communication link's channels. The combination of any or all of protocol, control signal format, control signal encoding, and unique identifier may be used by the system component to perform the selection of the proper channel; upon selection, further procedures in the protocol can be implemented to confirm the proper selection and/or to authenticate the system component for further transaction with the system controller.

In one embodiment of the present invention, the system controller periodically transmits the control signal to the system component in a selected channel of the multi-channel communication link. In another embodiment of the invention, the system controller may transmit the control signal only when communication connections to one or more system components have failed or have not yet been established. Optionally, another system controller also transmits one or more additional control signals in one or more additional signaling channels. The original control signal as well as the additional control signals optionally each include an identification code that identifies all other signaling channels, so that when the component controller locates one signaling channel, it may readily identify all other signaling channels.

The component controller first initializes the system component and begins to search, for a time period "N", all channels of the communication link to identify the particular signaling channel. If the signaling channel is not found during the time period N, then the component controller determines whether the system component performs appropriate internal recovery actions and escalates these until the only remaining option is that the system should be reset, and resets the system component as necessary before re-starting the search. If the signaling channel is found during the time period N, then the component controller establishes a communication connection with the system controller in accordance with the control signal carried by the signaling channel.

Once a successful communication connection has been established, the operation and performance of the system component may be remotely controlled and monitored by the system controller through the connection. In addition, the communication application stored in the component memory is then initialized. If the communication application successfully initializes within a time period "T", then the component controller executes the communication application. If the communication application does not initialize within the time period T, it is likely that the application may require additional control signals for proper initialization. Accordingly, the component controller continues to search the communication link to identify the additional channels and to receive the additional control signals communicated thereon so that the communication application may properly initialize.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote corresponding or similar elements throughout the various figures.

DETAILED DESCRIPTION OF THE CURRENTLY PREFERRED EMBODIMENTS

While the system and method of the invention are described herein with specific reference to a single system component connected to a system controller, it should be understood that multiple system components may be connected to the system controller via the same multi-channel communication link, or the connection to the system component may consist of several single or multi-channel communication links, without departing from the spirit of the invention.

Figure 1:
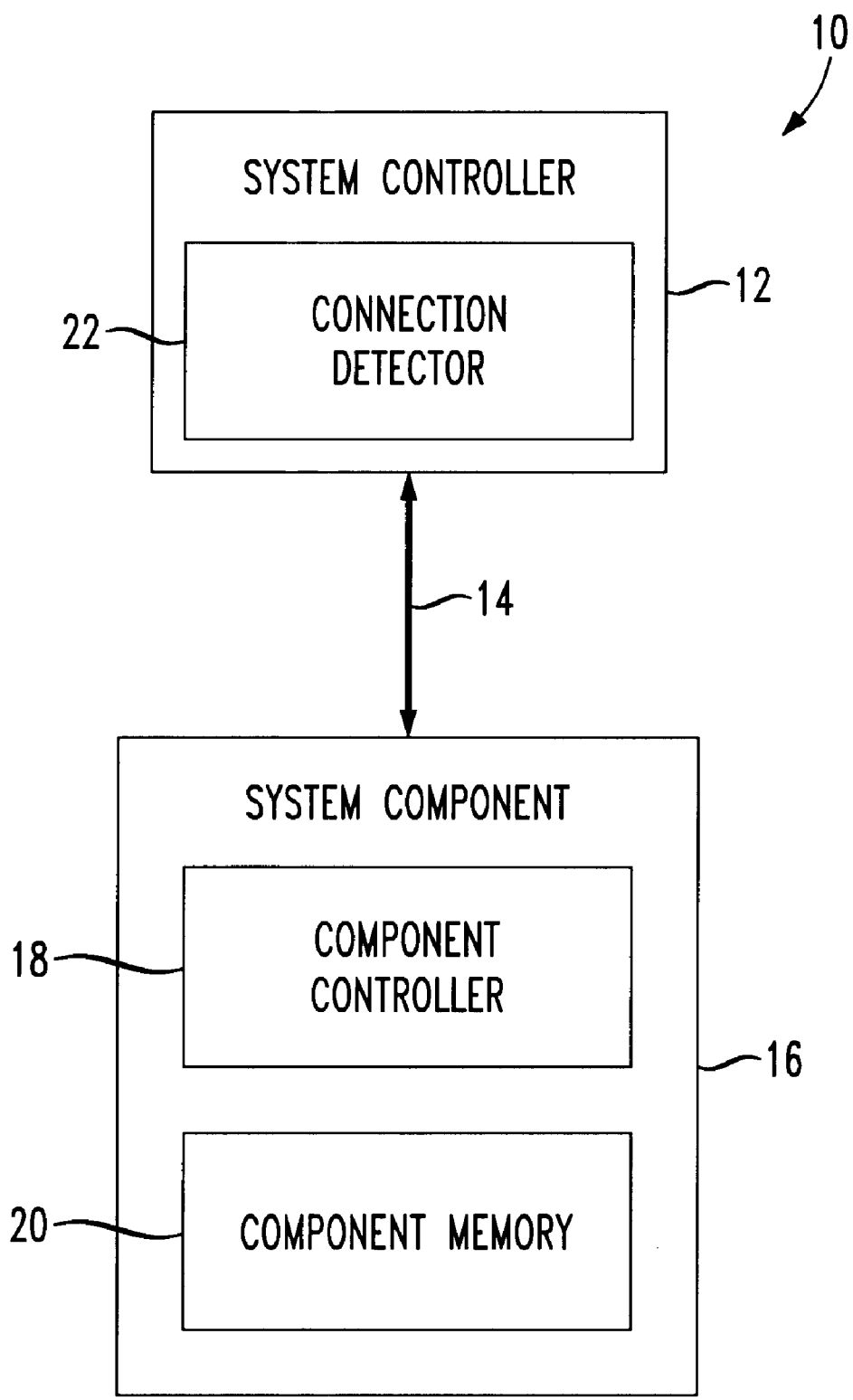
FIG. 1 is a schematic block diagram of a multi-channel communication system in accordance with the present invention.

Referring now to the drawings, and initially to FIG. 1 thereof, a communication system 10 includes a system component 16, such as a cellular telephone base station, for providing communication services to end users (not shown), a system controller 12 for controlling the operation of system 10 and for transmitting a control signal to the system component 16, and a multi-channel communication link 14, such as a high speed T1 line, connecting the system controller 12 and the system component 16 and having one or more channels for carrying the control signal transmitted by the system controller 12 to the system component 16. The system component 16 includes a component controller 18 for controlling the operation of the system component 16, for identifying and receiving the control signal from the system controller 12 and for initiating communication with the system controller 12 when the control signal is received. The system component 16 also includes a component memory 20 for storing a communication application, such as a cellular telephone service provider module, that may be executed by the component controller 18 when communication between the system component 16 and the system controller 12 is established.

The control signal includes initialization information for the system component 16 as well as instructions for establishing a communication connection between the system component 16 and the system controller 12 using an appropriate communication protocol or combination of communication protocols such as TCP/IP, LAPD, ATM, and/or Frame Relay. The control signal also includes a unique identifier for identifying, to the system component 16, the channel that is carrying the control signal as a signaling channel. For example, the unique identifier may be implemented as a unique data packet or an encoded protocol ID field or header.

In one embodiment of the present invention, the system controller 12 periodically transmits the control signal to the system component 16 in a particular selected channel, i.e. the signaling channel, of the multi-channel communication link 14. The signaling channel may be selected as a matter of design choice. One of the main advantages of the present invention is that the signaling channel is not hard-coded into the communication link 14 or the system controller 12—the particular channel used as the signaling channel may be changed as needed or appropriate.

Optionally, the system controller 12 incorporates a connection detector 22 for detecting a connection between the system controller 12 and the system component 16; the system controller transmits the control signal only when the communication detector 22 determines that the communication connection to the system component 16 has failed or has not yet been established. This approach provides more efficient system bandwidth utilization since periodic transmission of the control signal is terminated when a successful connection with the system component is established. However, this approach requires use of the communication detector 22 and thus increases the complexity of system controller 12.

Alternately, the system controller 12 also transmits several additional control signals carried by one or more additional signaling channel(s) of the communication link 14. The unique identifiers of the original control signal and of the additional control signals preferably include an identification code that identifies all other signaling channels, so that when the component controller 18 locates one signaling channel it may readily identify all other signaling channels. Typically, such additional control signals may be necessary when the system component 12 is configured for execution of a complex communication application.

The operation of the system component 16 is generally controlled by a control program stored in the component memory 20 and executed by the component controller 18. This control program usually consists of multiple integrated program modules, with each module bearing responsibility for controlling one or more functions of the system component 16. For example, one program module may control scanning of the communication link 14 to locate one or more signaling channels, while another module may control establishing communication with the system controller 12 when the appropriate signaling channel is located. In effect, each program module is a control program dedicated to a specific function or set of functions of the system component 16.

Figure 2:
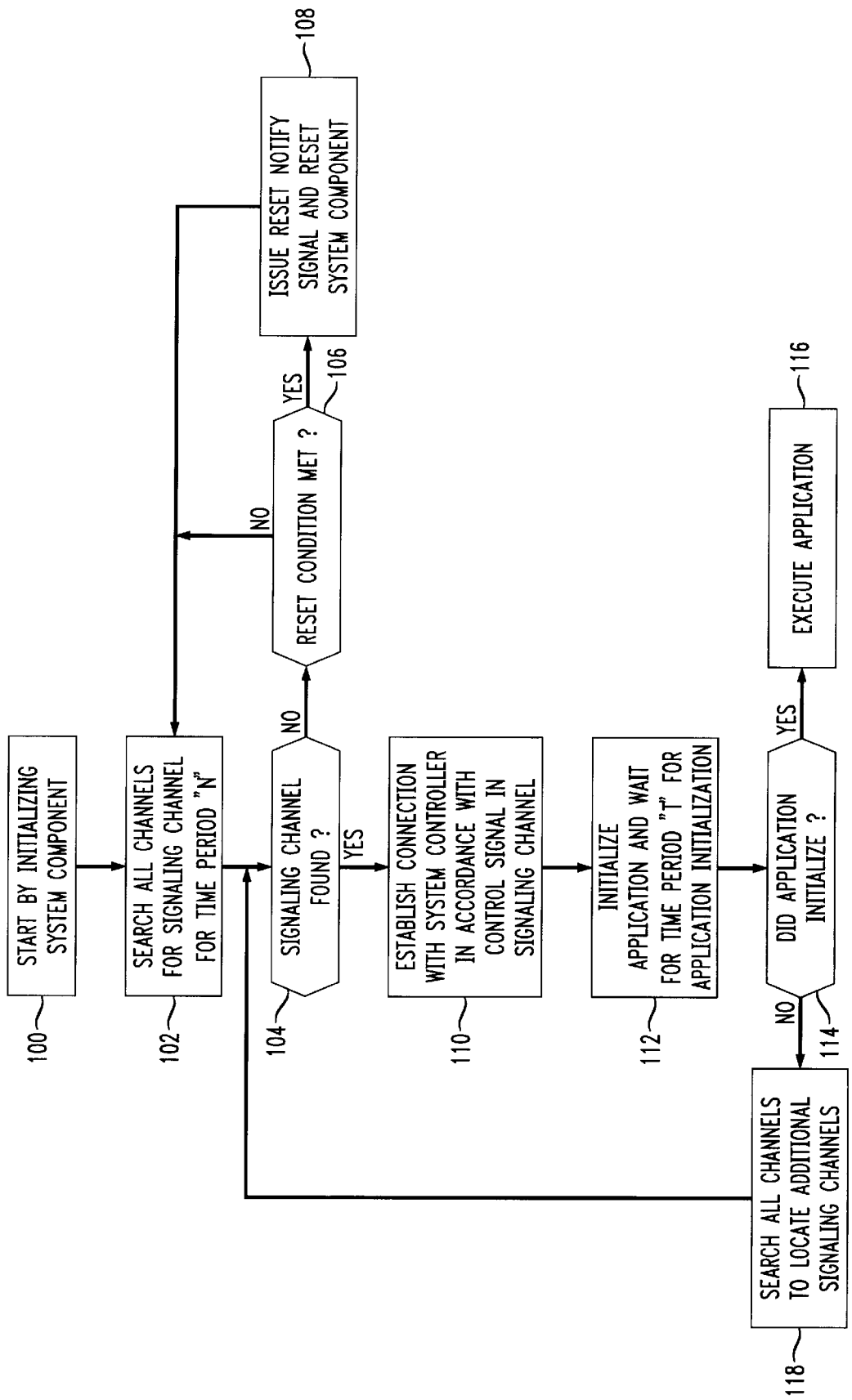
FIG. 2 is a logic flow diagram of a signaling channel identification control program executed by the component controller of the system of FIG. 1, in accordance with the principles of the present invention.

FIG. 2 depicts a logic flow diagram representing the control program for controlling the identification of one or more signaling channels and for establishing communication with the system controller 12 when the one or more of signaling channels of the communication link 14 have been located, executed by the component controller 18 of FIG. 1 in accordance with the present invention.

The component controller 18 first initializes the system component 16 at a step 100 and, at a step 102, begins to scan, for a predetermined time period "N", all channels of the communication link 14 to locate the unique identifier and thus identify the signaling channel. The time period N may be selected as a matter of design choice. By way of example, N may be five seconds.

At a test 104, the component controller 18 determines if the signaling channel has been found during the time period N. If the signaling channel has not been found during the time period N, then at a test 106 the component controller 18 determines whether reset conditions for the system component 16 are met. One possible reason for failure of the component controller 18 to locate the signaling channel may be an error in the configuration of the component controller 18 that may be corrected by resetting the system component 16. However, resetting the system component 16 results in wear and tear on the component and causes delays in the communication service provided by the component. Thus, the system component 16 should only be reset when a reset condition, selected as a matter of design choice, is met. Examples of reset conditions may include, but are not limited to, passage of a total time period "M" from initialization of the system component 16 at the step 100, a total number of times that step 102 has been performed since initialization of the component, and that all other, less dramatic, recovery techniques have been attempted.

If the reset condition is not met, then the component controller 18 returns to step 102 where it restarts the search for the signaling channel for the time period N. If, on the other hand, the reset condition is met, then at a step 108 the component controller 18 resets the system component 16 and issues a reset notification signal to indicate that the system component 16 has been reset before returning to the step 102. This signal may be transmitted to the system controller 12 via the communication link 14, or be issued to an output device, such as a monitor (not shown) connected to the system component 16 for review by technical personnel.

If the signaling channel is found (at the test 104) by the component controller 18 during the time period N, then at a step 110 the component controller 18 establishes a communication connection with the system controller 12 in accordance with the control signal carried by the signaling channel. For example, the control signal may carry link layer or higher level communication protocol information used by the component controller 18 to initiate and successfully negotiate communication with the system controller 12. Once a successful communication connection has been established, the operation and performance of the system component 16 may be remotely controlled and monitored by the system controller 12 through the connection.

At a step 112, the component controller 18 initializes the communication application stored in the component memory 20, and waits for the application to initialize for a predetermined time period "T". At a test 114, the component controller 18 then determines whether the communication application properly initialized at step 112. If the communication application successfully initializes within the time period T, then at a step 116 the component controller 18 executes the communication application and execution of the control program ends. If, on the other hand, the communication application does not properly initialize within the time period T, it is likely that the application may require additional control signals for proper initialization. Accordingly, at a step 118 the component controller 18 scans the communication link channels to identify additional channels and to thus receive the additional control signals before returning to test 104. Preferably the control signal carried by the signaling channel identified at step 102, as well as the additional control signals, include the identification code that specifies possible additional signaling channels to the component controller 18 so that, at step 118, the component controller 18 need only scan those signaling channels specified by the identification code.

While there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A system for establishing communication between a system controller and a system component via a communication link, the communication link being configured to carry a control signal and data communication signals in at least one channel of a plurality of channels, the system comprising:

a first controller in the system controller for selectively assigning the control signal to a particular channel of the plurality of channels;

a transmitter in the system controller for periodically transmitting, through the communication link and in said particular channel, the control signal to the system component; and a second controller in the system component for scanning the plurality of channels for a predetermined first time period to identify said particular channel, and operable for:

(i) receiving the control signal from the identified particular channel and establishing communication with the system controller via the communication link in accordance with the control signal when said particular channel is identified during said predetermined first time period, and (ii) determining whether a reset condition is met when said particular channel is not identified during said predetermined first time period, and:

(A) when said reset condition is determined to be met, resetting the system component, restarting said predetermined first time period, and resuming said scan of the plurality of channels, and (B) when said reset condition is determined to be not met, restarting said predetermined first time period, and resuming said scan of the plurality of channels to identify said particular channel.

2. The system of claim 1, wherein the system component is configured to execute a predetermined communication application, and wherein said first controller comprises a selector for selectively assigning an additional control signal to an additional channel of the plural channels, the system further comprising a third controller in the system component and operable for:

(i) initializing the predetermined communication application when said control and data communication with the system controller is established, and (ii) determining whether said communication application has successfully initialized during a predetermined second time period, and:

(A) when it is determined that the communication application has successfully initialized during said predetermined second time period, executing said communication application, and (B) when it is determined that the communication application has not successfully initialized during said predetermined second time period, triggering said second controller to scan said plurality of channels to identify said additional channel and, when said additional channel is identified, re-initializing said communication application in accordance with said additional control signal.

3. The system of claim 1, wherein said second controller comprises a generator for generating a reset notification signal indicative of resetting of the system component.

4. The system of claim 1, wherein said reset condition comprises one of expiration of a third predetermined period of time measured from a first activation of said second controller, and a predetermined number of times that said second controller has restarted said predetermined first time period.

5. The system of claim 2, wherein each of the control signal and said additional control signal comprises an identifying component for assisting said second controller in identifying the additional channel, and wherein said second controller further comprises means for retrieving said identifying component from one of the control signal and the additional control signal.

6. The system of claim 5, wherein said identifying component comprises a unique identification code.

7. The system of claim 1, further comprising a detector in the system controller for determining whether communication is established between the system controller and the system component, and operable for:

(i) deactivating said transmitter when communication is determined to be established between the system controller and the system component, and (ii) selectively triggering said transmitter when communication is determined to be not established between the system controller and the system component.

8. A method for establishing communication between a system controller and a system component via a communication link, the communication link being configured to carry a control signal and data communication signals in at least one channel of a plurality of channels, the method comprising the steps of:

(a) selectively assigning the control signal to a particular channel of the plurality of channels;

(b) periodically transmitting, through the communication link and in said particular channel, the control signal to the system component;

(c) scanning the plurality of channels for a predetermined first time period to identify said particular channel, and (1) when said particular channel is identified during said predetermined first time period, receiving the control signal from the identified particular channel and establishing communication with the system controller via the communication link in accordance with the control signal, and (2) when said particular channel is not identified during said predetermined first time period, determining whether a reset condition is met, and:

(A) when said reset condition is determined to be met, resetting the system component, restarting said predetermined first time period, and repeating said step (c); and (B) when said reset condition is determined to be not met, restarting said predetermined first time period, and repeating said step (c).

9. The method of claim 8, wherein the system component is configured to execute a predetermined communication application, further comprising the steps of:

(d) selectively assigning, after said step (a) and before said step (b), an additional control signal to an additional channel of the plural channels;

(e) after said step (c) and when the communication with the system controller is established, initializing the predetermined communication application; and (f) determining whether the predetermined communication application has successfully initialized during a predetermined second time period, and:

(3) when the predetermined communication application is determined to have successfully initialized during said predetermined second time period, executing the predetermined communication application, and (4) when the predetermined communication application is determined to have not successfully initialized during said predetermined second time period, repeating said step (c) to scan said plurality of channels to identify said additional channel and, when said additional channel is identified, re-initializing the predetermined communication application in accordance with said additional control signal.

10. The method of claim 8, wherein said step (A) further comprises the step of generating a reset notification signal indicative of resetting of the system component.

11. The method of claim 8, wherein said reset condition comprises one of expiration of a third predetermined period of time measured from a first activation of said second control means, and a predetermined number of times that said second control means has restarted said predetermined first time period.

12. The method of claim 9, wherein each of the control signal and said additional control signal comprises an identifying component for facilitating identification of said additional channel, and wherein said step (4) further comprises the step of retrieving said identifying component from one of the control signal and said additional control signal.

13. The method of claim 12, wherein said identifying component comprises a unique identification code.

14. The method of claim 8, further comprising the step of:
(h) determining, by the system controller, whether communication is established between the system controller and the system component, and:
(5) when communication is determined to be established between the system controller and the system component, ending performance of said step (b), and
(6) when communication is determined to be not established between the system controller and the system component, performing said step (b).

15. A system component for use in a communication system that includes a system controller, a communication link for connecting the system controller and the system component and configured to carry a control signal and data communication signals in at least one channel of a plurality of channels, a first controller in the system controller for selectively assigning the control signal to a particular channel of the plurality of channels, and a transmitter in the system controller for periodically transmitting the control signal through the communication link and in the particular channel, said system component comprising:
a second controller in the system component for scanning the plurality of channels for a predetermined first time period to identify said particular channel, said second controller being configured and operable for:
(i) receiving the control signal from the identified particular channel and establishing communication with the system controller via the communication link in accordance with the control signal when said particular channel is identified during said predetermined first time period, and
(ii) determining whether a reset condition is met when said particular channel is not identified by said second controller during said predetermined first time period, and:
(A) when said reset condition is determined to be met, resetting the system component, restarting said predetermined first time period, and resuming said scan of the plurality of channels, and
(B) when said reset condition is determined by said second controller to be not met, restarting said predetermined first time period, and resuming said scan of the plurality of channels to identify said particular channel.

16. The system component of claim 15, wherein the first controller of the system controller includes a selector for selectively assigning an additional control signal to an additional channel of the plural channels, and wherein said system component is configured to execute a predetermined communication application, said system component further comprising a third controller configured and operable for:
(i) initializing the predetermined communication application when said control and data communication with the system controller is established, and
(ii) determining whether the communication application has successfully initialized during a predetermined second time period, and:
(A) when it is determined by said third controller that the communication application has successfully initialized during said predetermined second time period, executing said communication application, and
(B) when it is determined by said third controller that the communication application has not successfully initialized during said predetermined second time period, triggering said second controller to scan said plurality of channels to identify said additional channel and, when said additional channel is identified, re-initializing the communication application in accordance with said additional control signal.

17. The system component of claim 15, wherein said reset condition comprises one of expiration of a third predetermined period of time measured from a first activation of said second controller, and a predetermined number of times that said second controller has restarted said predetermined first time period.

18. The system component of claim 16, wherein each of the control signal and said additional control signal comprises an identifying component for assisting said second controller in identifying the additional channel, and wherein said second controller further comprises means for retrieving said identifying component from one of the control signal and the additional control signal.

19. The system component of claim 18, wherein said identifying component comprises a unique identification code.

* * * * *